(12) United States Patent
Choi

(10) Patent No.: US 6,879,570 B1
(45) Date of Patent: Apr. 12, 2005

(54) METHOD FOR OPERATING PERSONAL AD-HOC NETWORK (PAN) AMONG BLUETOOTH DEVICES

(75) Inventor: Joon-bo Choi, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 913 days.

(21) Appl. No.: 09/667,813

(22) Filed: Sep. 22, 2000

(30) Foreign Application Priority Data

Nov. 26, 1999 (KR) ........................................ 1999-52992

(51) Int. Cl.[7] .............................................. H04Q 7/00
(52) U.S. Cl. ......................... 370/329; 700/3; 709/209
(58) Field of Search .................... 327/297; 340/3.1, 340/3.2, 3.21, 573.1, 825.2, 825.65; 369/4; 370/254, 255, 310, 338, 374, 389, 401, 420, 438, 439, 450, 451, 452, 453, 414, 456.3, 550.1, 563, 316, 329; 455/414, 456.3, 550.1, 563; 700/3, 9, 94; 704/211, 267, 500; 709/208, 209, 223, 224, 248; 710/8, 14, 45; 375/133, 222, 281, 322

(56) References Cited

U.S. PATENT DOCUMENTS 5,682,379 A * 10/1997 Mahany et al. ............. 370/315
5,686,888 A * 11/1997 Welles et al. .......... 340/539.13
5,691,980 A   11/1997 Welles, II et al. .......... 370/316
6,233,228 B1 *  5/2001 Collar et al. ............... 370/315
6,366,622 B1 *  4/2002 Brown et al. ............... 375/322

FOREIGN PATENT DOCUMENTS

| GB | 2 291 564 A | 1/1996 | ............ H04B/7/26 |
| GB | 2 346 511 A | 8/2000 | ............ H04B/7/155 |

* cited by examiner

Primary Examiner—Wellington Chin
Assistant Examiner—John Shew
(74) Attorney, Agent, or Firm—Sughrue Mion, PLLC

(57) ABSTRACT

A method for operating a personal ad-hoc network (PAN) among a plurality of Bluetooth devices is provided. The method for operating a PAN among a plurality of Bluetooth devices includes the steps of: (a) performing an inquiry in a Bluetooth device, checking whether other Bluetooth devices are present in the communicable range of the Bluetooth device, and determining the presence of a response to the inquiry; (b) as the PAN's master, storing PAN's slave information and sending it to other slaves when a request for establishment of a connection occurs after repeating inquiry and page scans if there is no response to the inquiry in step (a); and (c) establishing a connection and then changing into a slave role if there is a response to the inquiry in step (b) from a network master, and then receiving PAN information from the network master.

9 Claims, 2 Drawing Sheets

METHOD FOR OPERATING PERSONAL AD-HOC NETWORK (PAN) AMONG BLUETOOTH DEVICES

BACKGROUND OF THE INVENTION

1. Field of the Invention

The present invention relates to a method for operating a network among devices, and more particularly, to a method for operating a personal ad-hoc network (PAN) among Bluetooth devices. The present application is based on Korean Application No. KPA 99-52992, which is incorporated herein by reference.

2. Description of the Related Art

In general, Bluetooth is a specification in which diverse electronic devices can send and receive data with each other using a large bandwidth through radio frequencies without physical cables, and is proposed in "Bluetooth Specification Version 1.0." At present, Internet access from a mobile communication terminal requires a terminal having a data communication function, a notebook computer, and a separate cable for connecting these two devices. However, if Bluetooth is commercialized, data communications between devices can be conducted wirelessly, and devices such as a digital camera, a printer will not need a cable connection. Bluetooth enables a wireless data communications transmission rate of 1 Mbps with a 10 m maximum transmission distance.

However, though the Bluetooth specification offers point-to-point, or point-to-multipoint connections, it does not offer a centralized control organization, and lacks an administrative function for operating as a network. Also, communications among Bluetooth devices are based on inquiry and page operations, but without a centralized administrative function or scenario, page scan or inquiry scan cannot be performed properly, which makes mutual communications difficult. In addition, there is a drawback in that each device wastes much time collecting information on other devices (for example, address, name, etc.).

SUMMARY OF THE INVENTION

To solve the above problems, it is an objective of the present invention to provide a method for a operating personal ad-hoc network (PAN) among Bluetooth devices by performing functions of PAN master or slave according to the presence of a response to an inquiry among Bluetooth devices.

To accomplish the above object of the present invention, there is provided a method for operating a personal ad-hoc network (PAN) among a plurality of Bluetooth devices, the method having the steps of (a) performing an inquiry in a Bluetooth device, checking whether other Bluetooth devices are present in the communicable range of the Bluetooth device, and determining the presence of a response to the inquiry; (b) as the PAN's master, storing PAN's slave information and sending it to other slaves when a request for establishment of a connection occurs after repeating inquiry and page scans if there is no response to the inquiry in step (a); and (c) establishing a connection and then changing into a slave role if there is a response to the inquiry in step (b) from a network master, and then receiving PAN information from the network master.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
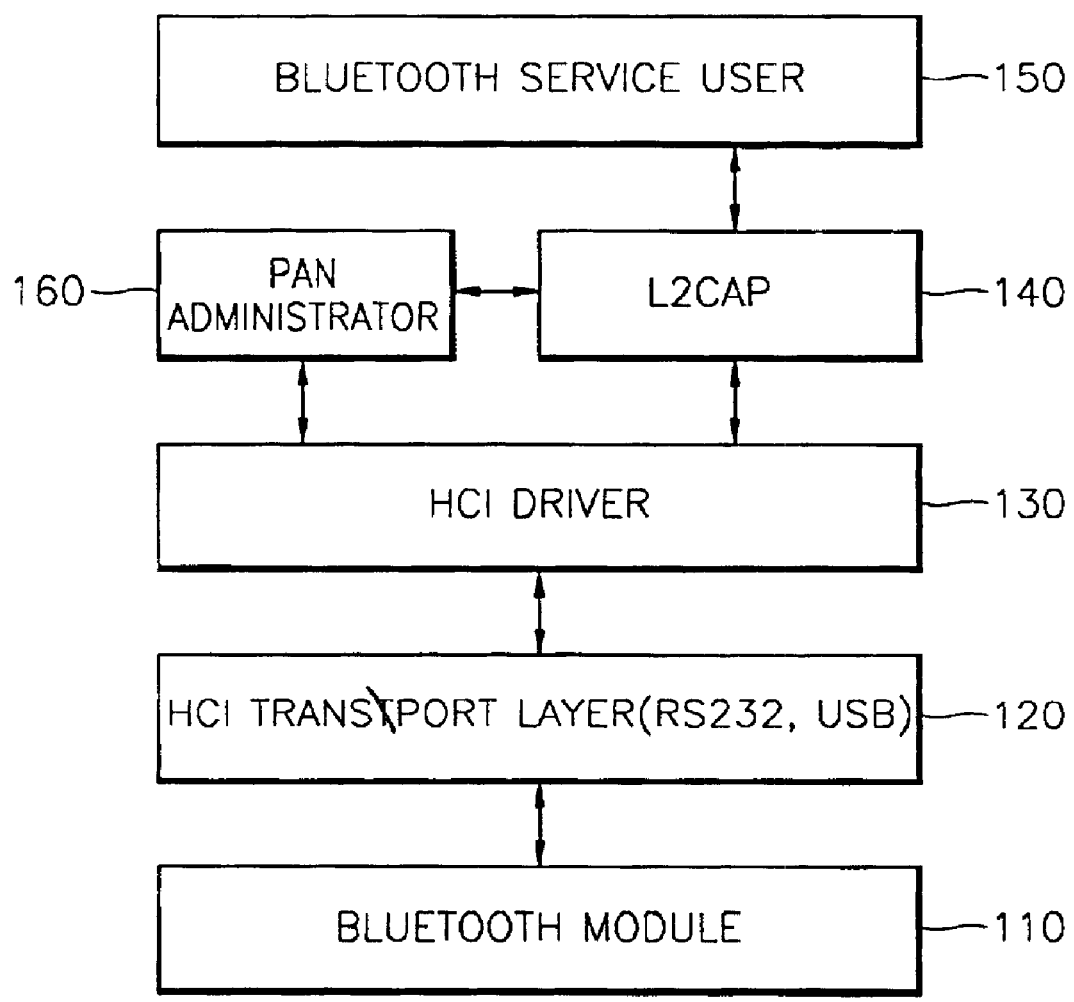
FIG. 1 is a block diagram of a Bluetooth system according to the present invention.

FIG. 1 is an entire block diagram of a Bluetooth system according to the present invention.

Bluetooth is a method without a centralized administrative function. Therefore, a device performs an inquiry and checks whether other Bluetooth devices are present in its communicable range in order to communicate with other Bluetooth devices. Other Bluetooth devices receive inquiries from the device through an inquiry scan, and send responses to the inquiries through an inquiry response function The device can find a 48-bit address of the opposite device through the inquiry response which sends a Frequency Hopping Synchronization (FHS). A connection is established between devices by the address. A calling device which wants to establish a connection starts a page process using a predetermined address. At this time, a called device periodically performs page scans, and a connection with the calling device can be established because the duration of the page is usually longer than that of page scan. The called device found through the page scan that it is being paged immediately starts establishing a connection, and a connection is successfully established if there is no abnormal condition. In addition, Bluetooth offers immediate point-to-point, or point-to-multipoint connections without a centralized administration. At this time, a device that requests establishment of a connection, that is, a device that requests a page, is set to master, and a device that responds to a page is set to slave. The master and the slave are the names of Role. The slave is synchronized with an internal clock of the master. However, if the device is a slave, which performs a page response, it can request a change of roles.

There are four operation modes, including Active, Hold, Park, and Sniff, in Bluetooth. Active mode is a state in which a master and a slave communicate with each other, and the other modes can be operated according to a request by a master or a slave. A master in Bluetooth can have a total of 255 slaves, and can operate up to 7 slaves in Active mode simultaneously. Therefore, devices which are not in a communication state are set to Park mode. However, there is no recommendation on with what logic the mode change is performed. Since up to 7 master-slave connections can be supported simultaneously if a personal ad-hoc network (PAN) is set up, a master will perform appropriate mode-changing of each slave for a network with more devices.

According to FIG. 1, a Bluetooth module 110 is an independent device connected to a device which wants to use Bluetooth (hereinafter referred to as 'host') through a serial connection such as an RS232C or Universal Serial Bus (USB). A host controller interface (HCI) transport layer 120 is the RS232C or the USB, controls the module with a series of commands defined in the standards and responds to the commands, as well as communicating host data. A logical link control and adaptation protocol (L2CAP) 140 is a communication protocol defined in the standards, and controls diverse protocols of higher level. An HCI driver 130 communicates HCI commands defined in the standards and responds to the command, and data sent and received through the L2CAP, through the HCI transport layer 120. A Bluetooth service user 150 is an application which uses a Bluetooth service. A PAN administrator 160 performs PAN administration function which integrates devices with a Bluetooth module 110 in a network. In addition, the PAN administrator 160 with an interface to a user application program offers a network service, and communicates with a PAN master, using the L2CAP 140 having a position equal to that of diverse communication protocols present above the L2CAP 140.

In order for Bluetooth devices to form and administer an ad-hoc network, a certain device must be a master of Bluetooth Piconet.

Figure 2:
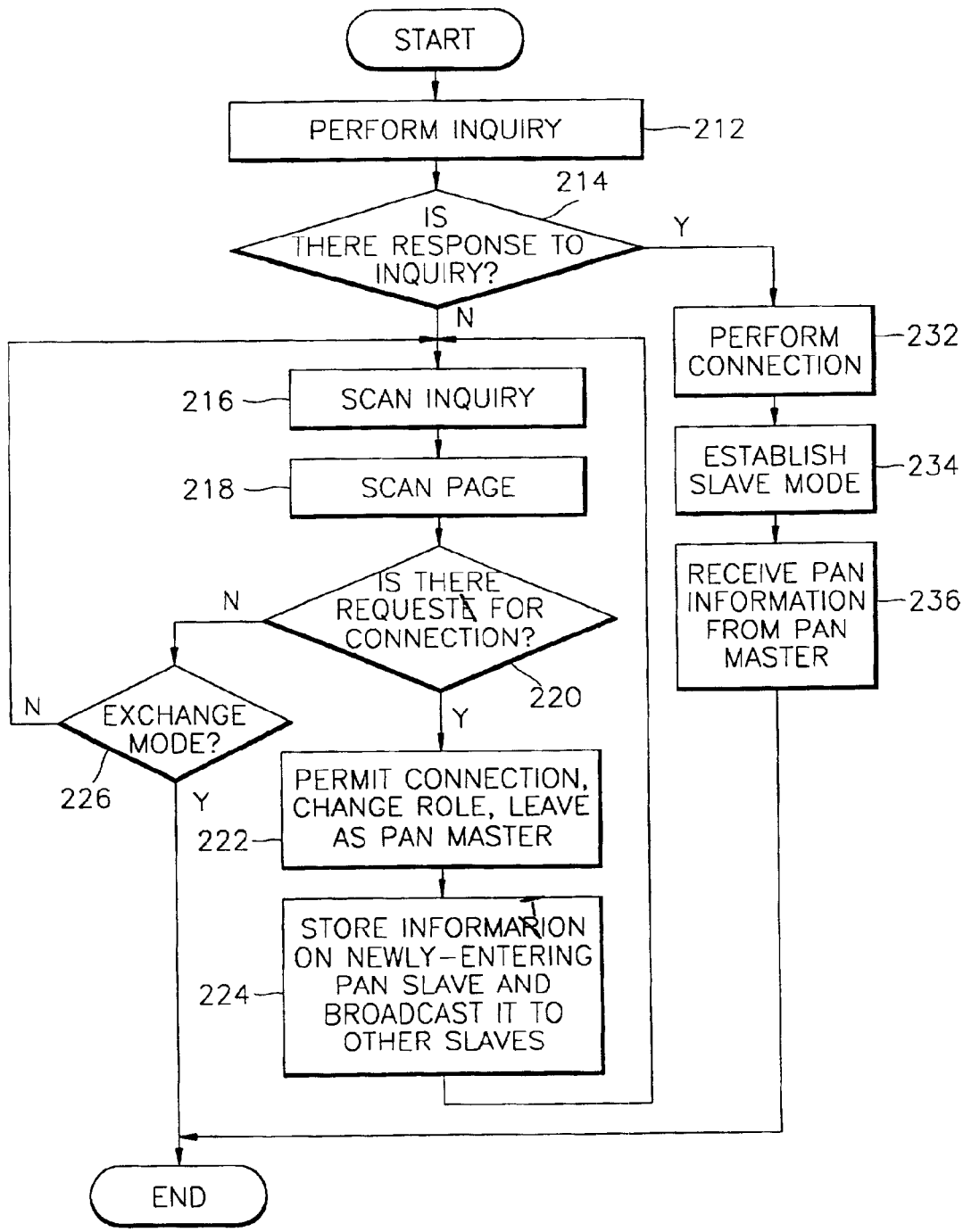
FIG. 2 is a flow chart showing a personal ad-hoc network (PAN) operation by a PAN administrator of FIG. 1.

FIG. 2 is a flow chart showing a PAN operation by a PAN administrator of FIG. 1 according to the present invention.

First, power is supplied to any one of a plurality of Bluetooth devices.

Next, a PAN administrator 160 of the Bluetooth device performs an inquiry and checks whether other Bluetooth devices are present in its communicable range in steps 212 and 214.

At this time, the device changes into a master or slave mode of the PAN according to the presence of a response to the inquiry, and performs the following functions.

First, if there is no response to the inquiry, the device repeats an inquiry scan and page scan in steps 216 and 218. Then, the device properly changes the modes of slaves in the PAN as needed, and checks the requests for a connection of a slave which enters newly in step 220. At that time, until the mode changes when there is no request for connection by a slave, the device repeats steps from inquiry scan in step 226. Also, the device permits a connection if there is a request for a connection from a slave, and changes the role and leaves as a PAN master in step 222. Then, the device sends information on itself and slaves that makes up the current PAN to a newly-entering slave, and stores and broadcasts to other slaves information (for example, addresses, names, etc.) on PAN slaves which newly enter or go out in step 224. In addition, the device disconnects a connection to a certain slave in response to a slave request, and designates an order of back-up master in preparation for a master's going-out from the current network.

Meanwhile, if there is a response to the inquiry, it means there is a presence of an already-established PAN in the communicable range of the device. Therefore, if the device is in the PAN, the device does not perform page scan and inquiry scan. Also, the device leaves as a slave to the PAN master by changing the role, when a connection is established after performing page to the PAN master in order to newly enter the already-established PAN, in steps 232 and 234. Then, the device receives information on all the salves making up the PAN from the PAN master, and at this time receives information on a back-up master as well in step 236. Next, if the device does not communicate with other devices in the PAN, the device changes into a Park mode, and receives information broadcasted by the current PAN master and updates its PAN information in step 236. At that time, if the device wants to communicate with other slaves, the device makes a request for disconnecting the wanted slave from the PAN master to the PAN master, and if the connection between slaves is finished, the device again enters the PAN. In addition, if the PAN master goes out, the device again forms a PAN by finding out a master according to a back-up master order designated when entering the PAN.

Therefore, by switching to a master function or a slave function of a PAN according to an inquiry response, a device can always newly enter a PAN, all devices in the PAN can share information on the newly entering device, and each device in the PAN can communicate with any other device by making a request.

As described above, if a personal ad-hoc network (PAN) according to the present invention is formed in Bluetooth devices, all devices in the network do not need respective connections to other devices to get information on other devices. Also a device can more reliably establish a connection to other devices by a PAN slave making a request to connect to other slaves in the PAN to the PAN master.

What is claimed is:

1. A method for operating a network among a plurality of communication devices, the method comprising the steps of:
   (a) using a first communication device to perform an inquiry which checks whether or not at least one other communication device is present in the communicable range of the first communication device, and determining the presence of at least one other communication device according to a response to the inquiry;
   (b) when there is a response to the inquiry in the step (a), establishing a connection with the network and then, causing the first communication device to change into a role of slave and to receive network information from the master of the network; and
   (c) establishing the first communication device as a master of the network and causing the first communication device to store slave information and to broadcast the slave information to other slaves when there is no response to the inquiry in the step (a).

2. The method of claim 1, further comprising the step of changing modes of the slaves in the network, after repeating inquiry and page scan when there is no response in the step (a), so that connections to incoming slaves of the network are established.

3. The method of claim 1, further comprising a step of designating a back-up master order at the time of entry into the network in step (b) and broadcasting the back-up master order to other slaves.

4. The method of claim 1, further comprising a step of determining a master according to a designated back-up master order if there is no network master established in step (b).

5. The method of claim 1, further comprising a step of changing the first communication device into a Park mode if the first communication device does not communicate with another device after receiving network information from the network master, receiving information broadcast by the network master, and updating the network information received in step (b).

6. A method for operation a network among a plurality of communication devices, the method comprising the steps of:
   (a) using a first communication device to perform a page scan which checks whether or not at least one other communication device is present in the communicable range of the first communication device, and determining the presence of at least one other communication device according to a response to the page scan; and
   (b) when there is at least one other communication device, establishing the first communication device as a master of the network;
   wherein the first communication device broadcasts slave information to at least one new device entering the network substantially soon after said at least one new device enters the network.

7. A method for operating a network among a plurality of communication devices, the method comprising the steps of:

(a) using a first communication device to perform an inquiry which checks whether or not at least one other communication device is present in the communicable range of the first communication device, and determining the presence of at least one other communication device according to a response to the inquiry;

(b) when there is a response to the inquiry in the step (a), establishing a connection with the network and then, causing the first communication device to change into a role of slave and to receive network information from the master of the network; and (c) designating a back-up master order at the time of entry into the network in step (b) and broadcasting the back-up master order to other slaves.

8. A method for operating a network among a plurality of communication devices, the method comprising the steps of:

(a) using a first communication device to perform an inquiry which checks whether or not at least one other communication device is present in the communicable range of the first communication device, and determining the presence of at least one other communication device according to a response to the inquiry;

(b) when there is a response to the inquiry in the step (a), establishing a connection with the network and then, causing the first communication device to change into a role of slave and to receive network information from the master of the network; and (c) determining a master according to a designated back-up master order if there is no network master established in step (b).

9. A method for operating a network among a plurality of communication devices, the method comprising the steps of:

(a) using a first communication device to perform an inquiry which checks whether or not at least one other communication device is present in the communicable range of the first communication device, and determining the presence of at least one other communication device according to a response to the inquiry;

(b) when there is a response to the inquiry in the step (a), establishing a connection with the network and then, causing the first communication device to change into a role of slave and to receive network information from the master of the network; and (c) changing the first communication device into a Park mode if the first communication device does not communicate with another device after receiving network information from the network master, receiving information broadcast by the network master, and updating the network information received in step (b).

* * * * *